US006418822B1

(12) United States Patent
Case

(10) Patent No.: US 6,418,822 B1
(45) Date of Patent: Jul. 16, 2002

(54) CUT-OFF APPARATUS FOR NON-CIRCULAR TUBES

(75) Inventor: Manson Drew Case, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 71 days.

(21) Appl. No.: 09/603,702

(22) Filed: Jun. 27, 2000

(51) Int. Cl.[7] .................................................. B23B 5/14
(52) U.S. Cl. .................................. 82/46; 82/82; 82/113
(58) Field of Search ............................... 82/113, 46, 47, 82/82, 89, 95, 133, 129

(56) References Cited

U.S. PATENT DOCUMENTS

| | | | | |
|---|---|---|---|---|
| 1,519,754 A | | 12/1924 | Butler | |
| 2,062,291 A | | 12/1936 | Brown | |
| 3,036,503 A | | 5/1962 | Geist | |
| 3,259,003 A | | 7/1966 | Griffin | |
| 3,293,963 A | | 12/1966 | Carroll et al. | |
| 3,359,841 A | | 12/1967 | Cvacho et al. | |
| 3,717,056 A | * | 2/1973 | Gracin et al. | 82/82 |
| 3,802,364 A | | 4/1974 | Paramonoff | |
| 3,875,831 A | * | 4/1975 | Beauloye | 82/113 |
| 3,939,561 A | * | 2/1976 | Nichols | 30/107 |
| 4,474,564 A | | 10/1984 | Sireix | |
| 4,521,264 A | | 6/1985 | Mueller | |
| 4,766,789 A | * | 8/1988 | Sayer | 82/47 |
| 4,934,225 A | | 6/1990 | Languillat et al. | |
| 5,193,374 A | | 3/1993 | Castricum | |
| D382,446 S | | 8/1997 | Bacon | |
| 6,047,578 A | * | 4/2000 | Thieven | 72/11.6 |
| 6,101,910 A | * | 8/2000 | Nicolai et al. | 82/101 |
| 6,205,895 B1 | * | 3/2001 | Schartinger et al. | 82/47 |

FOREIGN PATENT DOCUMENTS

| | | | |
|---|---|---|---|
| GB | 2-135-232 A | * | 8/1984 |
| JP | 60-102273 | * | 6/1985 |

* cited by examiner

*Primary Examiner*—Henry Tsai
(74) *Attorney, Agent, or Firm*—Alston & Bird LLP

(57) ABSTRACT

A cut-off apparatus for non-circular tubes includes an axially movable carriage supporting one or more cutter assemblies and a drive system for driving the carriage synchronously with an advancing tubes. The advancing tube is received over a cutting mandrel mounted for movement with the carriage. The one or more cutter assemblies are disposed within the mandrel and comprise radially movable knives that are extended outward so as to cut the tube from the inside. The knives are urged radially outwardly by a cam moved by a control rod disposed within the mandrel. A clamp assembly is mounted on the carriage radially outwardly of the tube aligned with a cutter assembly, and includes clamp members that move inwardly to clamp the tube from the outside to restrain the tube against radially outward movement when being cut. The carriage drive system includes a motor for driving the carriage, a controller connected with the motor, and a sensor for detecting advancement of the tube so that the controller can drive the carriage in synchronism with the tube.

18 Claims, 3 Drawing Sheets

CUT-OFF APPARATUS FOR NON-CIRCULAR TUBES

FIELD OF THE INVENTION

The invention relates to devices for cutting tubes formed by wrapping continuous plies of paperboard or the like about a mandrel and adhering the plies together so as to form a continuous tube that is advanced along the mandrel to a cut-off apparatus where the tube is cut into sections of desired length. The invention relates more particularly to devices for cutting non-circular tubes formed in this manner.

BACKGROUND OF THE INVENTION

Tubes formed from plies of fibrous material such as paperboard or the like are used for many purposes, including containers for consumer products. Many such containers are round in cross-section, for example, cans for refrigerated dough, juice cans, cans for snack foods, and many others. Round containers are typically produced by spirally winding paperboard plies and other plies such as liner plies and outer label plies onto a round mandrel to form a tube on the mandrel. The tube is engaged by a spiral winding belt that helically advances the tube along the mandrel to a cut-off apparatus where the tube is cut into predetermined lengths for later processing to form containers. The cut-off apparatus generally comprises an arrangement of saw blades that are pivoted into engagement with the tube at one side thereof. The saw blades are mounted on a moving carriage that moves along with the advancing tube in the longitudinal direction so that the only relative movement between the tube and the saws is a rotation of the tube about its axis. Thus, the full circumference of the tube can be cut by the saw blade from the outside of the tube.

Non-circular tubes are usually formed in a different manner from round tubes. Rather than spirally winding the plies onto the mandrel, the plies are drawn linearly along and wrapped longitudinally about the mandrel. Thus, the tube does not rotate as it advances along the mandrel. Accordingly, it is not possible to cut the tube by a saw that engages only one side of the tube as is done with round tubes. Instead, the tube is conventionally cut by a plurality of knives that encircle the tube from the outside and are moved radially inwardly to cut the tube against the mandrel.

One drawback to the conventional cutting device for non-circular tubes is that it can be difficult to cut all the way through the thickness of the tube, particularly when the tube includes a non-paper liner as its innermost ply. Such liners typically include a polymer layer to serve as a moisture barrier, and frequently also include a metal foil layer to lend strength to the polymer layer and to act as a gas barrier. There can be problems in achieving a clean cut all the way through the liner ply in the conventional cutting process, because the liner can stretch and deform under the force of the knives.

SUMMARY OF THE INVENTION

The above needs are met and other advantages are achieved by the present invention, which provides a cut-off apparatus for non-circular tubes in which the tube is cut from the inside toward the outside so that the liner is the first ply to be cut by the knives. The liner can be cut cleanly because it is backed up by the paper plies of the tube body.

In accordance with one preferred embodiment of the invention, a cut-off apparatus for cutting a continuously formed tube being advanced along a longitudinal axis of the tube comprises a carriage movably mounted for translation along the longitudinal axis in forward and rearward directions respectively with and against the direction of movement of the advancing tube. The apparatus also includes a carriage drive system operable to drive the carriage in the forward and rearward directions such that the carriage is driven in the forward direction in synchronism with the advancing tube. Thus, the tube is generally stationary relative to the carriage during at least part of the forward movement of the carriage. The cut-off apparatus further includes a tube cutting system coupled to the carriage for reciprocating movement therewith. The tube cutting system comprises a tubular mandrel positioned to receive the advancing tube thereover, and at least one cutter assembly. The cutter assembly includes a plurality of radially movable knives mounted within the mandrel and an actuator for urging the knives radially outward. The mandrel defines an opening for radially outward passage of each knife therethrough so as to cut through a wall of the tube from an inside surface to an outside surface thereof.

Preferably, the apparatus includes at least one clamp assembly coupled to the carriage in a position radially outward of the tube on the mandrel, the clamp assembly including clamp members that are movable radially inwardly to engage the tube opposite the knives so as to restrain the tube against radially outward movement during cutting.

In order to cut more than one section from the tube at one time, the cut-off apparatus preferably comprises a plurality of the cutter assemblies spaced apart a predetermined distance along the longitudinal axis, and a like number of clamp assemblies spaced apart and aligned with the cutter assemblies. The clamp members of each clamp assembly preferably have tube-engaging surfaces configured to collectively engage substantially the entire outer perimeter of the tube. The tube-engaging surfaces preferably define recesses therein aligned with the knives such that the knives can extend at least partially into the recesses.

In one preferred embodiment of the invention, the knives are actuated by a cam that is axially movable by the actuator so as to cause a surface of the cam to engage radially inner ends of the knives and thereby urge the knives radially outwardly for cutting the tube. The cam preferably is attached to a control rod that extends out one end of the mandrel, the actuator being coupled with the control rod and operable to move the control rod to cause the knives to be urged radially outwardly. After a cutting operation, the knives are urged back to their radially inward starting positions by springs connected to the knives.

In a preferred embodiment of the invention, the drive system for the carriage includes a sensor operable to detect advancement of the tube in the longitudinal direction, a controller connected to the actuator and to the sensor and operable to determine a distance and speed of advancement of the tube based on a signal from the sensor, and a motor connected to the controller and coupled with the carriage for moving the carriage in the longitudinal direction. When the tube has been advanced a predetermined distance, the controller causes the motor to advance the carriage at the same speed as the tube and causes the actuator to actuate the cutter assembly to cut the tube into sections. The sensor preferably comprises a roller in rolling engagement with the tube and an encoder coupled with the roller. Based on the signal from the encoder, the controller can determine the distance the tube has traveled from the number of revolutions of the roller and a known diameter of the roller, and can determine the speed of the tube from the rotational rate of the roller. Once the tube has been cut into sections, the carriage is returned to its starting position to begin the process again.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
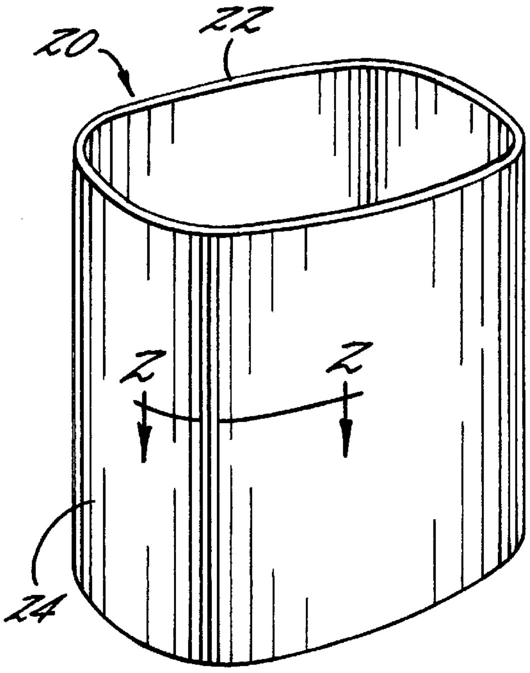
FIG. 1 is a perspective view of a non-circular container.
Figure 3:
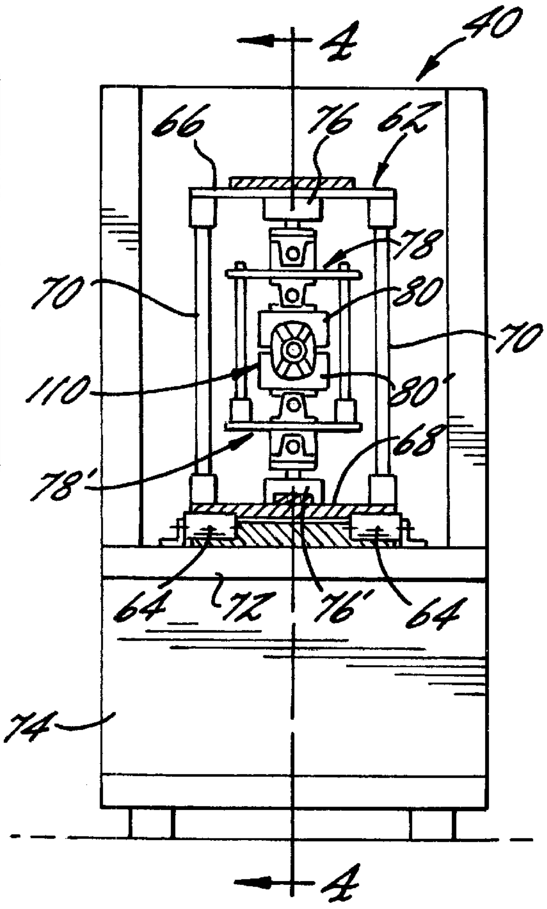
FIG. 3 is an end cross-sectional view of a cut-off apparatus of a tube-forming apparatus in accordance with one embodiment of the invention.
Figure 2:
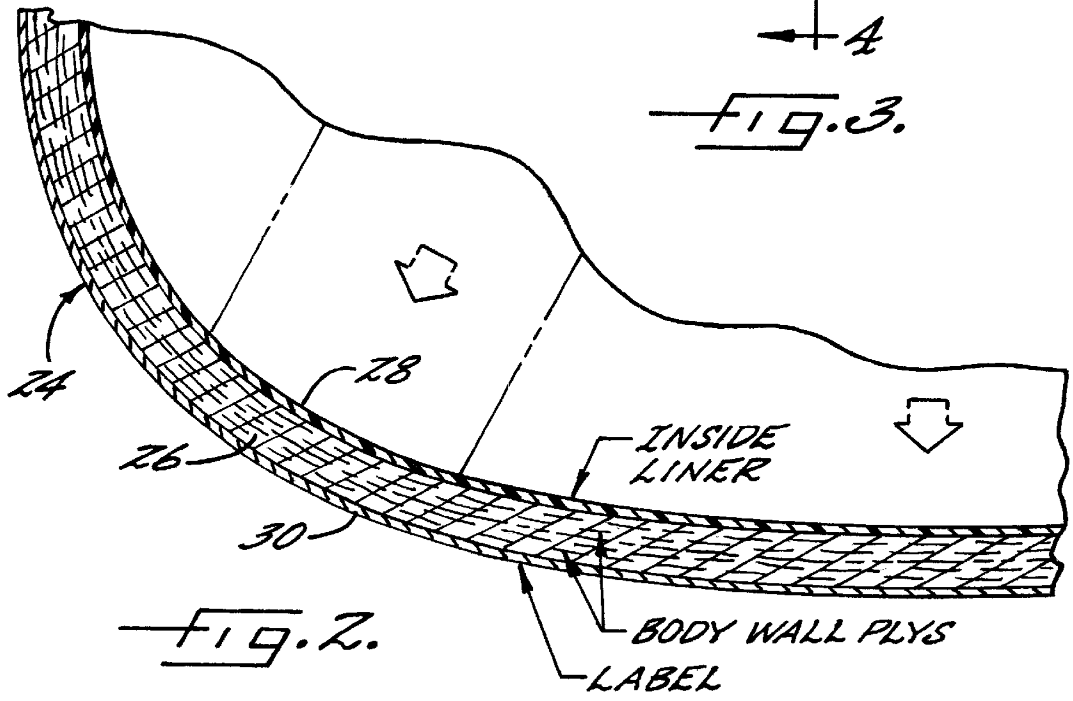
FIG. 2 is a cross-sectional view through the wall of the container taken on line 2—2 of FIG. 1.

The present invention can be used for cutting tubes of any cross-sectional shape, but is particularly concerned with the cutting of non-circular tubes. Such tubes can be used for making containers of various types, as well as for other purposes. An illustrative non-circular container is depicted in FIGS. 1 and 2 and is broadly designated by reference numeral 20. The container 20 may include a rolled flange or bead 22 at each end of the body portion 24 of the container, and an end closure (not shown) may be attached to each end. The body portion 24 of the container is typically constructed as shown in FIG. 2, and comprises a plurality of body plies 26 of paperboard or the like wrapped longitudinally about the central axis of the container and adhered to one another by a suitable adhesive disposed between the plies. The container body frequently also includes an inner liner 28 and an outer label 30 forming the innermost and outermost plies of the container, respectively. The liner 28 generally includes a layer of polymer material such as polyester or polyolefin on the inner side of the liner that contacts the product contained in the container, and often includes one or more other layers such as metal foil to lend strength to the liner and to serve as a barrier to the passage of gases through the liner. The liner may also include further layers such as paper.

The body portion 24 of the container is formed from a tubular section cut from a longer tube that is typically formed on a forming mandrel by advancing continuous strips of liner ply, body ply, and label ply material from respective supply rolls, drawing the various plies longitudinally along the mandrel, wrapping the plies about the mandrel, and adhering the plies to one another with adhesives applied between adjacent plies. The tube is thus formed continuously and advances along the mandrel to a cut-off apparatus where the tube is cut into desired lengths.

Figure 4:
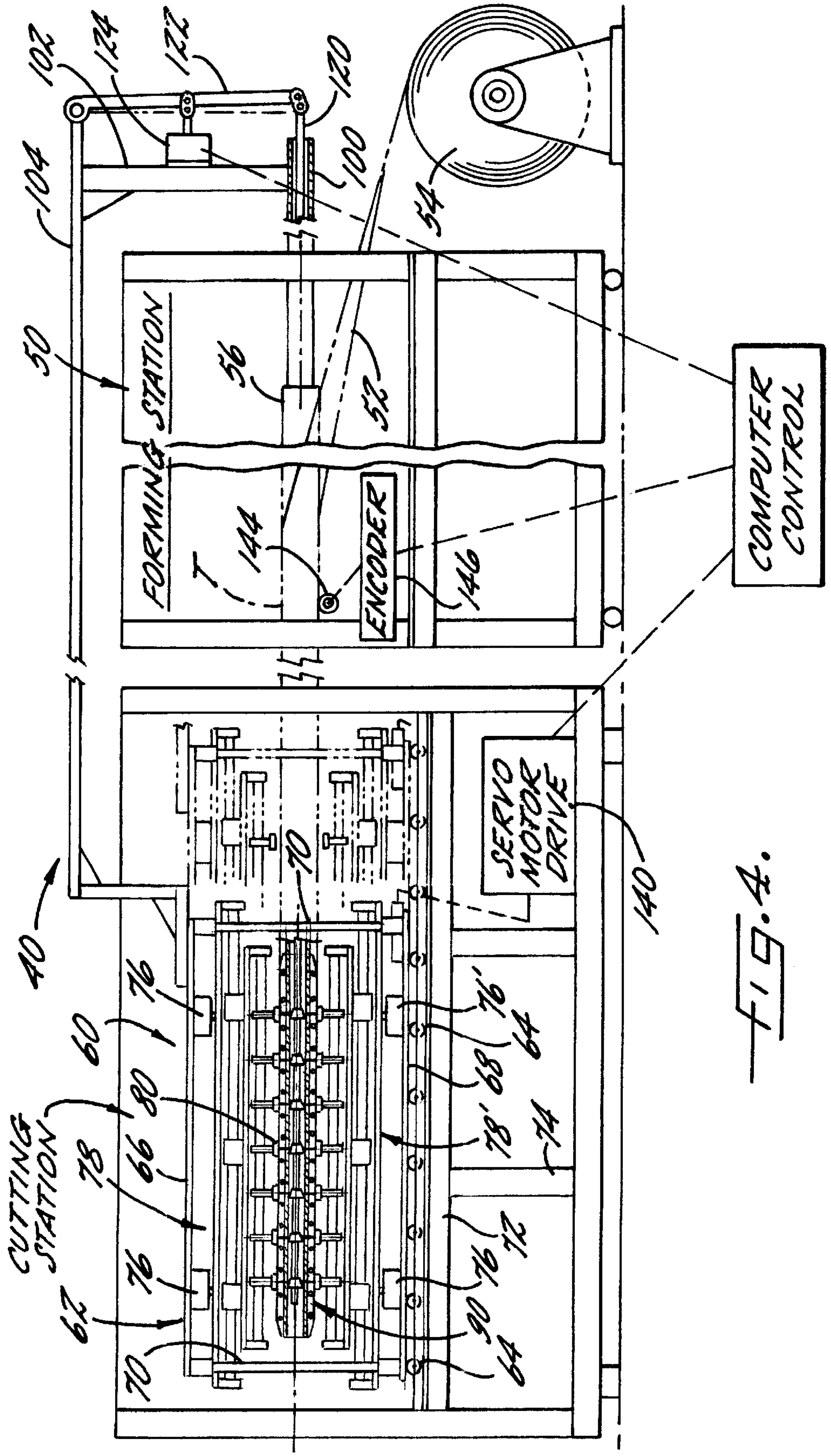
FIG. 4 is a longitudinal cross-section of the tube-forming apparatus taken on line 4—4 of FIG. 3.

FIGS. 3 through 8 depict an apparatus 40 for forming a longitudinally wrapped tube and cutting the tube into sections of desired length. With reference to FIG. 4, the apparatus 40 includes a forming station 50 at which the plies 52 of liner, body, and label material are drawn from respective supply rolls 54 thereof and are pulled along a forming mandrel 56 by a suitable pulling device (not shown), and are wrapped about the mandrel by a suitable wrapping device (not shown) so that opposite longitudinal edges of each ply overlap slightly. The forming station 50 also includes adhesive applicators (not shown) for applying adhesive to the various plies to adhere the plies together to form a cohesive tube T on the forming mandrel 56. Suitable devices for pulling the plies and wrapping the plies about the mandrel and for applying adhesive to the plies are known in the art and hence are not described herein.

The apparatus 40 further includes a cut-off apparatus 60 for cutting the tube T into sections. The cut-off apparatus 60 has a carriage 62 mounted on rollers 64 so that the carriage can travel forward (i.e., to the left in FIG. 4) in the direction along which the tube T is being advanced as it is formed, and can travel in the opposite direction against the direction of tube movement. The carriage 62 in the illustrated embodiment is constructed as a generally rectangular frame having a horizontal top member 66 and a horizontal bottom member 68 spaced therebelow and connected to the top member by a plurality of vertical members 70 that extend therebetween. The carriage 62 is supported by the rollers 64 atop a carriage bed 72 that is mounted on a support frame 74 disposed on the floor or other support surface.

The carriage 62 supports a pair of hydraulic or pneumatic upper clamp cylinders 76 on the top member 66 and extending toward the bottom member 68. Similarly, the bottom member 68 supports a pair of lower clamp cylinders 76' extending toward the top member 66. The clamp cylinders 76, 76' on each of the top and bottom members are operable to extend and retract toward and away from the opposite member. Attached to the upper clamp cylinders 76 is an upper clamp frame 78 on which are supported a plurality of upper clamp members 80 that are spaced apart in the longitudinal direction along which the advancing tube T is moving. Likewise, attached to the extendable element of the lower clamp cylinders 76' is a lower clamp frame 78' on which are supported a plurality of lower clamp members 80' that are spaced apart in the longitudinal direction and aligned with the upper clamp members 80. The upper clamp members 80 each comprises a generally half-ring-shaped member whose inner surface is configured to substantially match the outer contour of the upper half of the tube T; similarly, the lower clamp members 80' comprise half-ring-shaped members configured to substantially match the outer contour of the lower half of the tube. Extension of the upper and lower clamp cylinders 76, 76' causes the upper and lower clamp members 80, 80' to be extended toward each other to engage the tube disposed therebetween as further described below.

Figure 5:
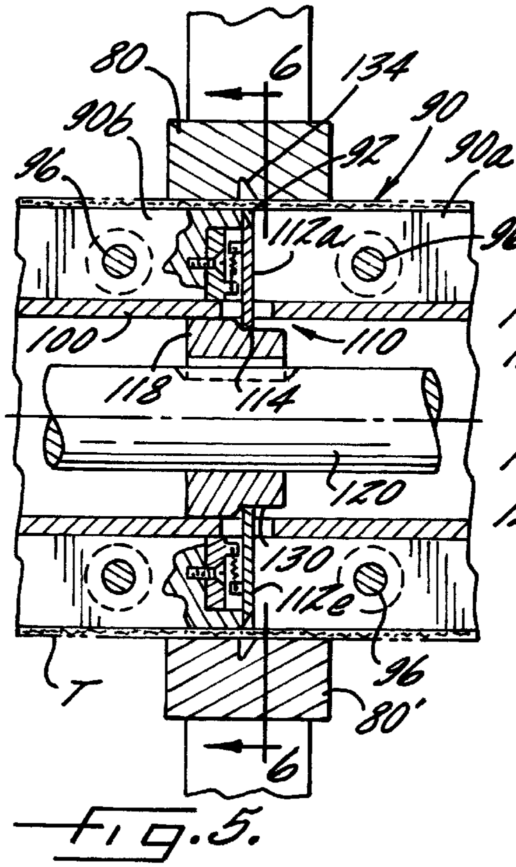
FIG. 5 is a magnified view of a portion of FIG. 4 showing in further detail one of the cutter assemblies of the cut-off apparatus, with the knives of the cutter assembly retracted.
Figure 6:
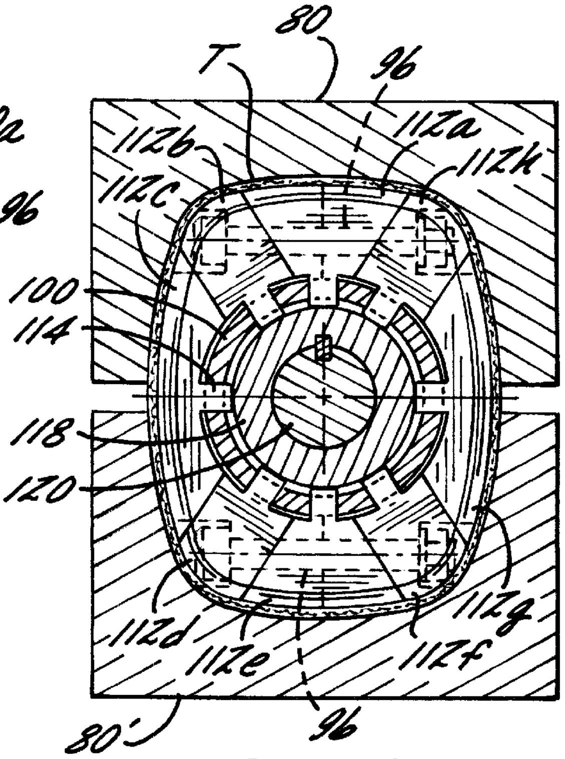
FIG. 6 is a cross-sectional view taken on line 6—6 of FIG. 5.
Figure 7:
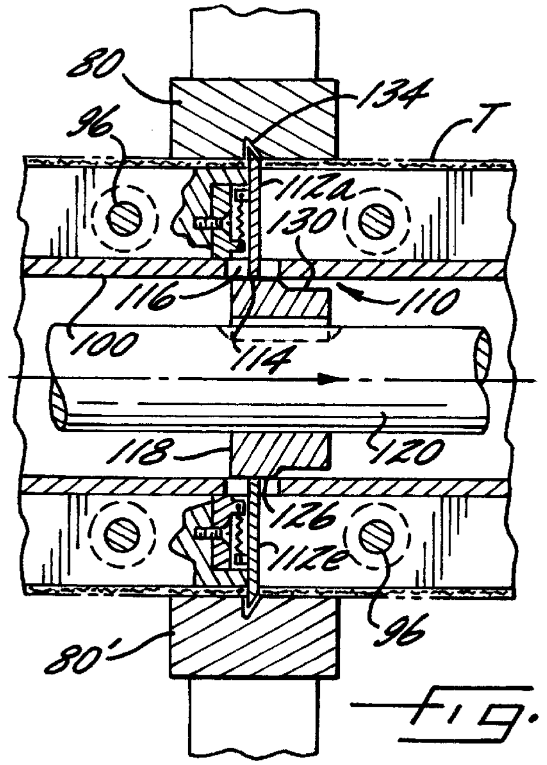
FIG. 7 is a view of the cutter assembly of FIG. 5, with the knives extended to cut through the tube.

The cut-off apparatus 60 also includes a tubular cutting mandrel 90 over which the advancing tube T is received. The mandrel 90 is formed separately from the forming mandrel 56, and is movable in the longitudinal direction by virtue of being mechanically coupled with the carriage 62 as described below. The mandrel 90 is best seen in FIGS. 5–7, and is constructed from a plurality of separately formed mandrel sections 90*a*, 90*b*, etc., of tubular form arranged end-to-end with spaces 92 between adjacent mandrel sections. Each mandrel section 90*a*, 90*b*, etc., is formed from a pair of half-circumferential segments that are fastened together with suitable fasteners 96 to form the full circumference of the tubular mandrel section. The mandrel sections 90*a*, 90*b*, etc., are mounted about an inner tube 100, the mandrel segments clamping about the inner tube 100 by virtue of the fasteners 96 that draw the two segments toward each other. The inner tube 100 extends out the end of the cutting mandrel 90 nearest the forming station 50 and passes through the interior of the forming mandrel 56 and projects out from the upstream end of the forming mandrel 56. A structural member 102 is attached to the upstream end of the inner tube 100 and is also attached to a longitudinally extending member 104 that is connected to the carriage 62 of the cut-off apparatus. Thus, when the carriage 62 moves in the longitudinal direction, the inner tube 100 is forced to move along with it, and hence the cutting mandrel 90 moves in synchronism with the carriage since the cutting mandrel is mounted on the inner tube.

The cut-off apparatus also includes a plurality of cutter assemblies 110 disposed within the cutting mandrel 90 in axial alignment with the clamping members 80, 80'. The longitudinal spacing of the cutter assemblies and clamping members is selected to provide tube sections of a desired length when the tube T is cut by the cutter assemblies. For example, the cut-off apparatus can include seven cutter assemblies spaced eight inches apart so as to cut the tube into seven eight-inch long sections. As best seen in FIGS. 5–8, each cutter assembly 110 in the illustrated embodiment includes eight radially reciprocatable knives 112*a–h* each having its cutting edge configured to match a portion of the circumference of the tube T such that the cutting edges of all of the knives collectively match the full circumference of the tube. Of course, it will be understood that various numbers and configurations of knives can be used, depending in part on the particular shape of the tube. The knives 112*a–h* are arranged in the space 92 between one mandrel section and the adjacent mandrel section. Each knife 112 has a radially inner end 114 that extends through an opening 116 in the inner tube 100. The radially inner ends 114 of the knives 112*a–h* all engage a cam 118 disposed inside the inner tube 100. The cams 118 for all of the cutter assemblies 110 are mounted on a control rod 120 that extends along the interior of the inner tube 100 and projects from the upstream end thereof as shown in FIG. 4. The control rod 120 is connected to an actuator linkage 122 that is coupled with an actuator 124 such as a servo motor or hydraulic or pneumatic cylinder mounted on the structural member 102. Each cam 118 has a large-diameter flat 126 at its downstream end, a ramp 128 that slopes radially inwardly in the upstream direction, and a small-diameter flat 130 at its upstream end. When the small-diameter flat 130 is axially aligned with the inner ends 114 of the knives, the knives are capable of moving radially inwardly to their retracted positions in which the cutting edges of the knives do not project outward of the outer surface of the mandrel 90, as shown in FIG. 5. The cutter assembly includes springs 132 connected between the knives and the mandrel 90 to urge the knives radially inwardly. The control rod 120 is arranged so as to position the cams 118 with their small-diameter flats in alignment with the knives when the actuator 124 is deactivated, as shown in FIG. 5.

Figure 8:
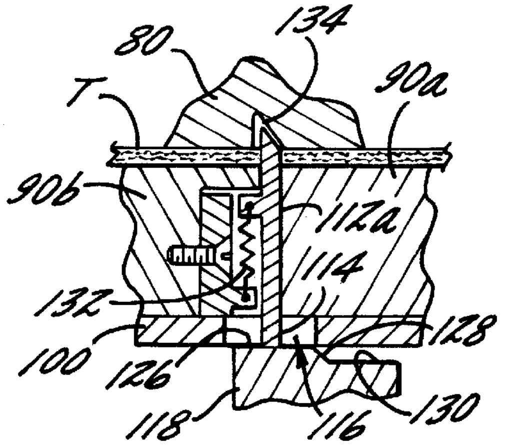
FIG. 8 is a magnified view of a portion of FIG. 7 showing one of the knives of the cutter assembly in further detail.

When the actuator 124 is activated, it moves the control rod in the upstream direction (to the right in FIGS. 4–8), which causes the ramps 128 of the cams to move past the inner ends of the knives thereby urging the knives radially outwardly as shown in FIGS. 7 and 8. The cutting edges of the knives thus extend radially outwardly beyond the outer surface of the mandrel so as to cut through the tube T. To restrain the tube against radially outward movement, the clamping members 80, 80' are moved radially inwardly by activating the clamp cylinders 76, 76' such that the clamping members engage the tube from its outer surface. The clamp members 80, 80' preferably include recesses 134 in their inner surfaces so that the cutting edges of the knives can extend into the recesses to facilitate a clean cut all the way through the wall of the tube.

The cut-off apparatus includes a drive system for driving the carriage 62 in synchronism with the longitudinal advancement of the tube T so that when the cutter assemblies cut the tube there is no relative axial movement between the tube and the cutter assemblies. The drive system includes a carriage drive device, preferably a servo motor 140, for driving the carriage forwardly (i.e., with the tube) and rearwardly (i.e., against the tube) in the longitudinal direction. The drive system also includes a controller 142 and a sensor operable to detect the longitudinal advancement of the tube. The sensor advantageously comprises a roller 144 in rolling engagement with the tube and an encoder 146 connected to the roller. Thus, when the tube T moves along the forming mandrel 56, the roller 144 is caused to rotate about its axis, and the encoder 146 is operable to determine the angular displacement and angular velocity of the roller rotation. Since the roller has a known diameter, the axial distance by which the tube moves can be determined from the encoder output based on the number of roller rotations (including any fractional part thereof) multiplied by the roller diameter. The speed of the tube advancement can be determined based on the roller angular velocity multiplied by the roller diameter. The controller 142 is programmed to activate the carriage servo motor 140 when the controller determines, based on the encoder output, that a predetermined length of tube T has been advanced. The controller controls the servo motor 140 to cause the carriage to quickly match speed with the tube T so that there is no relative axial movement between the tube and the carriage. Once the carriage speed and the tube speed are substantially equal, the controller activates the clamp cylinders 76, 76' to clamp the tube on the cutting mandrel and an instant later the controller activates the actuator 124 to activate the cutter assemblies 110 so as to cut the tube into sections.

The controller then causes the clamp cylinders to retract to unclamp the tube and causes the actuator 124 to move the control rod 120 back to the deactivated position so that the knives are retracted back into the cutting mandrel, and then commands the servo motor 140 to move the carriage 62 back to its upstream starting position (shown in phantom lines in FIG. 4) to begin the process again.

The invention thus provides a unique cut-off apparatus for tubes, particularly suitable for non-circular tubes in which the tube is not rotating as it advances along the mandrel, in which the tube is cut from the inside. Accordingly, if there is a tough liner ply on the inside of the tube, the liner can be easily cut.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A cut-off apparatus for cutting a length of tube from a continuously formed non-circular tube being advanced along a longitudinal axis thereof, comprising:

a carriage movably mounted for translation along said longitudinal axis in forward and rearward directions respectively with and against the direction of movement of the advancing tube;

a carriage drive system operable to drive the carriage in said forward and rearward directions such that the carriage is driven in said forward direction in synchronism with the advancing tube whereby the tube is generally stationary relative to the carriage during forward movement of the carriage; and a tube cutting system coupled to the carriage for reciprocating movement therewith, the tube cutting system comprising:

a tubular mandrel positioned to receive the advancing tube thereover; and at least one cutter assembly, the cutter assembly including a plurality of radially movable knives mounted within the mandrel and an actuator for urging the knives radially outward, the mandrel defining an opening for radially outward passage of each knife therethrough so as to cut through a wall of the tube from an inside surface to an outside surface thereof.

2. The cut-off apparatus of claim 1, further comprising at least one clamp assembly coupled to the carriage in a position radially outward of the tube on the mandrel, the at least one clamp assembly including clamp members that are movable radially inwardly to engage the tube opposite the knives so as to restrain the tube against radially outward movement during cutting.

3. The cut-off apparatus of claim 2, wherein the at least one cutter assembly comprises a plurality of said cutter assemblies spaced apart a predetermined distance along said longitudinal axis for simultaneously cutting a plurality of tube sections from the tube.

4. The cut-off apparatus of claim 3, wherein the at least one clamp assembly comprises a plurality of said clamp assemblies spaced apart and aligned with the cutter assemblies.

5. The cut-off apparatus of claim 2, wherein the clamp members of the at least one clamp assembly have tube-engaging surfaces configured to collectively engage substantially the entire outer perimeter of the tube.

6. The cut-off apparatus of claim 5, wherein the clamp members define recesses in the tube-engaging surfaces thereof, the recesses being aligned with the knives such that the knives can extend into the recesses.

7. The cut-off apparatus of claim 1, wherein the knives of the at least one cutter assembly include radially inner ends, and the cutter assembly further includes a cam defining a cam surface, the cam being axially movable by the actuator so as to cause the cam surface to engage the radially inner ends of the knives and thereby urge the knives radially outwardly for cutting the tube.

8. The cut-off apparatus of claim 7, wherein the cutter assembly includes springs connected to the knives for urging the knives radially inwardly.

9. The cut-off apparatus of claim 7, wherein the cam is attached to a control rod that extends out one end of the mandrel, the actuator being coupled with the control rod and operable to move the control rod to cause the knives to be urged radially outwardly.

10. The cut-off apparatus of claim 9, wherein the at least one cutter assembly comprises a plurality of said cutter assemblies spaced apart a predetermined distance along said longitudinal axis for simultaneously cutting a plurality of tube sections from the tube, and wherein a plurality of cams are attached to the control rod at locations therealong corresponding to locations of the cutter assemblies.

11. The cut-off apparatus of claim 10, further comprising a plurality of clamp assemblies coupled to the carriage radially outward of the tube on the mandrel, each clamp assembly being aligned with one of the cutter assemblies and including clamp members that are movable radially inwardly to engage the tube opposite the knives of the cutter assembly so as to restrain the tube against radially outward movement during cutting.

12. The cut-off apparatus of claim 9, wherein the drive system includes a sensor operable to detect advancement of the tube in the longitudinal direction, a controller connected to the actuator and to the sensor and operable to determine a distance and speed of advancement of the tube based on a signal from the sensor, and a motor connected to the controller and coupled with the carriage for moving the carriage in the longitudinal direction, the controller causing the motor to advance the carriage at the same speed as the tube and causing the actuator to actuate the cutter assembly when the tube has been advanced a predetermined distance.

13. The cut-off apparatus of claim 12, wherein the sensor comprises a roller in rolling engagement with the tube and an encoder coupled with the roller.

14. A cutter assembly for cutting a non-circular tube, comprising:

a tubular mandrel configured to receive the tube thereover;

a plurality of radially movable knives mounted within the mandrel, each of the knives being structured and arranged to cut a portion of a circumference of the tube and the plurality of knives collectively being structured and arranged to cut the entire circumference of the tube, the mandrel defining an opening for radially outward passage of each knife therethrough so as to cut through a wall of the tube from an inside surface to an outside surface thereof so as to sever one portion of the tube from another portion of the tube; and a knife actuation system operable to move the knives radially outwardly to cut the tube.

15. The cutter assembly of claim 14, wherein the knife actuation system comprises:

a cam mounted on a control rod within the mandrel, the cam being configured to engage radially inner ends of the knives and urge the knives radially outwardly when the control rod is moved; and an actuator operable to move the control rod to cause the cam to urge the knives radially outwardly.

16. The cutter assembly of claim 14, further comprising:

a clamp assembly mounted in a position radially outward of the tube on the mandrel, the clamp assembly including clamp members that are movable radially inwardly to engage the tube opposite the knives so as to restrain the tube against radially outward movement during cutting.

17. The cutter assembly of claim 16, wherein the clamp members are configured to engage the tube about substantially the entire perimeter thereof.

18. The cutter assembly of claim 16, wherein tube-engaging surfaces of the clamp members include recesses therein, the recesses being configured and positioned to receive cutting edges of the knives.

* * * * *

UNITED STATES PATENT AND TRADEMARK OFFICE

CERTIFICATE OF CORRECTION

PATENT NO. : 6,418,822 B1
DATED : July 16, 2002
INVENTOR(S) : Case

It is certified that error appears in the above-identified patent and that said Letters Patent is hereby corrected as shown below:

Title page,
Item [*] Notice, “Subject to any disclaimer, the term of this patent is extended or adjusted under 35 USC 154(b) by (71) days”, delete the phrase by “71 days” and insert -- by 0 days --

Signed and Sealed this

Fourteenth Day of October, 2003

JAMES E. ROGAN
*Director of the United States Patent and Trademark Office*